United States Patent
Une et al.

(10) Patent No.: US 8,348,772 B2
(45) Date of Patent: Jan. 8, 2013

(54) PLUNGING TYPE CONSTANT VELOCITY UNIVERSAL JOINT

(75) Inventors: Naohiro Une, Itami (JP); Tatsuro Sugiyama, Iwata (JP); Shin Tomogami, Iwata (JP); Hisaaki Kura, Iwata (JP)

(73) Assignee: NTN Corporation, Osaka (JP)

( * ) Notice: Subject to any disclaimer, the term of this patent is extended or adjusted under 35 U.S.C. 154(b) by 203 days.

(21) Appl. No.: 12/531,524

(22) PCT Filed: Mar. 11, 2008

(86) PCT No.: PCT/JP2008/054398
§ 371 (c)(1),
(2), (4) Date: Sep. 16, 2009

(87) PCT Pub. No.: WO2008/117659
PCT Pub. Date: Oct. 2, 2008

(65) Prior Publication Data
US 2010/0087262 A1    Apr. 8, 2010

(30) Foreign Application Priority Data
Mar. 27, 2007  (JP) ................................. 2007-082283

(51) Int. Cl.
*F16D 3/227*  (2006.01)

(52) U.S. Cl. ........................... 464/15; 464/144; 464/906

(58) Field of Classification Search .......... 464/143–146, 464/906, 139, 8, 9, 15; 384/492
See application file for complete search history.

(56) References Cited

U.S. PATENT DOCUMENTS

| | | | | |
|---|---|---|---|---|
| 4,432,741 A | * | 2/1984 | Winkler | ........................ 464/145 |
| 4,893,387 A | * | 1/1990 | Akamatsu et al. | |
| 5,064,298 A | * | 11/1991 | Hibi et al. | ................. 384/492 X |
| 5,456,136 A | * | 10/1995 | Yamashita et al. | |

(Continued)

FOREIGN PATENT DOCUMENTS

JP     2001-193751     7/2001

(Continued)

OTHER PUBLICATIONS

International Search Report dated Apr. 15, 2008 for International Application No. PCT/JP2008/054398.

(Continued)

*Primary Examiner* — Gregory Binda
*Assistant Examiner* — Matthieu Setliff
(74) *Attorney, Agent, or Firm* — Wenderoth, Lind & Ponack, L.L.P.

(57) ABSTRACT

A plunging type constant velocity universal joint includes an inner joint member having an outer peripheral surface in which a plurality of linear track grooves are formed in an axial direction and inclined with respect to an axial line, an outer joint member having an inner peripheral surface in which a plurality of linear track grooves are formed in the axial direction and inclined with respect to the axial line in a direction opposite to that of the track grooves of the inner joint member, and having an inside filled with a lubricant, balls incorporated in respective crossing portions between the track grooves of the inner and outer joint members, and a cage arranged between the outer peripheral surface and the inner peripheral surface for retaining the balls in the same plane, in which a large number of minute recesses are formed at random in surfaces of the balls.

8 Claims, 7 Drawing Sheets

U.S. PATENT DOCUMENTS

| | | | |
|---|---|---|---|
| 5,498,086 A * | 3/1996 | Ou | |
| 5,642,947 A * | 7/1997 | Akamatsu et al. | |
| 5,725,432 A * | 3/1998 | Konegen et al. | 464/145 |
| 6,390,924 B1 * | 5/2002 | Yoshida et al. | |
| 6,403,538 B1 * | 6/2002 | Ozaki et al. | |
| 6,736,729 B2 * | 5/2004 | Wang et al. | 464/906 X |
| 7,217,194 B2 * | 5/2007 | Goto et al. | |
| 2001/0016563 A1 | 8/2001 | Takabe | |
| 2002/0077186 A1 | 6/2002 | Hosoya et al. | |
| 2005/0020456 A1 | 1/2005 | Kawamura et al. | |
| 2009/0197688 A1 * | 8/2009 | Ushioda et al. | 464/139 |
| 2010/0087261 A1 * | 4/2010 | Kura et al. | 464/143 |
| 2010/0099504 A1 * | 4/2010 | Kobayashi et al. | 464/15 |
| 2011/0003645 A1 * | 1/2011 | Ooba et al. | 464/139 |
| 2011/0034255 A1 * | 2/2011 | Kobayashi et al. | 464/143 |
| 2011/0118036 A1 * | 5/2011 | Hamaguchi et al. | 464/143 |

FOREIGN PATENT DOCUMENTS

| | | | |
|---|---|---|---|
| JP | 2002-188653 | 7/2002 | |
| JP | 2005-8745 | 1/2005 | |
| JP | 2006-266423 | 10/2006 | |
| JP | 2007-016851 | 1/2007 | |
| WO | WO 2006100893 A1 * | 9/2006 | 464/144 |

OTHER PUBLICATIONS

E. R. Wagner, "Cross Groove Universal Joint", Universal Joint and Driveshaft Manual Section 3.2.12, pp. 163-166.

E. R. Wagner, "Cross Groove Universal Joint", Universal Joint and Driveshaft Manual Section 3.2.12, 1991, pp. 163-166.

International Preliminary Report on Patentability and Written Opinion of the International Searching Authority dated Oct. 29, 2009 in International (PCT) Application No. PCT/JP2008/054398.

* cited by examiner

PLUNGING TYPE CONSTANT VELOCITY UNIVERSAL JOINT

BACKGROUND OF THE INVENTION

I. Technical Field

The present invention relates to a cross groove constant velocity universal joint being a kind of a plunging type constant velocity universal joint, which is employed in a power transmission mechanism of an automobile or various industrial machines and is incorporated in a propeller shaft or a drive shaft used in, for example, a four-wheel drive (4WD) vehicle or a front-engine rear-drive (FR) vehicle.

II. Description of the Related Art

In some cases, a propeller shaft used in an automobile such as a 4WD vehicle or a FR vehicle includes a plunging type constant velocity universal joint called "cross groove joint" so as to cope with angular displacement resulted from change in relative position between a transmission and a differential.

FIGS. 7 to 10 illustrate an example of a cross groove constant velocity universal joint of a disk type. As illustrated in FIGS. 7 and 8, this constant velocity universal joint includes as main components an inner joint member 101, an outer joint member 102, balls 103, and a cage 104.

The inner joint member 101 has an outer peripheral surface in which a plurality of linear track grooves 106 are formed in the axial direction. Further, a shaft 107 is spline-fitted in a central hole 105 of the inner joint member 101, and torque can be transmitted between the shaft 107 and the inner joint member 101 owing to this spline-fitting. Note that the shaft 107 is prevented from being detached from the inner joint member 101 by a snap ring 108.

The outer joint member 102 is positioned along the outer periphery of the inner joint member 101, and has an inner peripheral surface in which linear track grooves 109 are formed in the axial direction by the same number as that of the track grooves 106 of the inner joint member 101. The cage 104 is arranged between the inner joint member 101 and the outer joint member 102, and the balls 103 are housed in pockets 110 of the cage 104.

The track grooves 106 of the inner joint member 101 and the track grooves 109 of the outer joint member 102 form, as illustrated in FIG. 9 (cage 104 is not shown), an angle inclined in the opposite direction with respect to an axial line L (track crossing angle $\alpha$). The balls 103 are incorporated in crossing portions between the track grooves 106 (indicated by solid lines in FIG. 9) of the inner joint member 101 and the track grooves 109 (indicated by chain lines in FIG. 9) of the outer joint member 102, the track grooves 106 and the track grooves 109 being paired with each other. Further, the track grooves 106 adjacent to each other of the inner joint member 101 and the track grooves 109 adjacent to each other of the outer joint member 102 are arranged while being inclined in opposite directions to each other with respect to the axial line L by the track crossing angle $\alpha$.

FIG. 10 is across sectional view illustrating the track grooves 106 of the inner joint member 101 and the track grooves 109 of the outer joint member 102. As illustrated in FIG. 10, the cross sectional shape of the track grooves 106, 109 is a shape of a gothic arch having the curvature radius larger than the radius of the balls 103 and formed by broaching or the like. The gothic arch shape allows the track grooves 106 of the inner joint member 101 and the track grooves 109 of the outer joint member 102 to contact each of the ball 103 at two points P, whereby angular contact having ball contact angles $\beta$ is achieved. In this case, the ball contact angles $\beta$ mean angles formed between ball contact centers P at which the ball 103 and the track grooves 106, 109 come into contact with each other and groove bottom centers Q of the track grooves 106, 109 with reference to a center Q of each of the balls 103.

On the other hand, to one axial end (left side in FIG. 7) of the outer joint member 102, an end cap 111 for preventing leakage of the lubricant filled inside the joint and invasion by foreign matters is fixed by bolting. Further, a sealing device is attached between the other axial end (right side in FIG. 7) of the outer joint member 102 and the shaft 107.

The sealing device includes a boot 112 and a boot adapter 113 made of metal. The boot 112 has a small end portion and a large end portion, and has a shape folded back at the middle portion in a V-shape. The boot adapter 113 is formed into a cylindrical shape, and has a flange, which is formed at one end thereof and fitted to the outer peripheral surface of the outer joint member 102. The boot adapter 113 is fixed to the outer joint member 102 together with the end cap 111 by bolting. The small end portion of the boot 112 is attached to the shaft 107 and clamped by a boot band 114. The large end portion of the boot 112 is retained by crimping the end portion of the boot adapter 113.

This constant velocity universal joint is disclosed in Universal Joint and Driveshaft Manual Section 3.2.12 "Cross Groove Universal Joint". Universal Joint and Driveshaft Manual Section 3.2.12 "Cross Groove Universal Joint" describes a basic cross groove constant velocity universal joint including four or more (six in general) balls 103. Each of the track crossing angles $\alpha$ between the track grooves 106 of the inner joint member 101 and the track grooves 109 of the outer joint member 102 is designed to be such an angle that, when the constant velocity universal joint forms the maximum operating angle, the track grooves 106, 109 opposed to each other are not parallel to each other (13 to 19° in general). Further, the groove diameters of the track grooves 106, 109 having a gothic-arched cross section are set to be 1.01 to 1.04 times lager than the diameter of the balls, and the ball contact angles $\beta$ are set to 30 to 45°.

Further, in the above-mentioned cross groove constant velocity universal joint, the track crossing angles $\alpha$ between the track grooves 106 of the inner joint member 101 and the track grooves 109 of the outer joint member 102 have relation to a sliding stroke of the joint. It is effective to reduce the track crossing angles $\alpha$ for increasing the stroke amount thereof.

However, when the track crossing angles $\alpha$ are reduced for increasing the sliding stroke of the joint, the maximum operating angle as the constant velocity universal joint becomes small. The maximum operating angle refers to an angle at which, when the joint is bent with not being rotated and then returned to the state before being bent, the maximum torque is applied. At worst, there occurs a phenomenon that the joint does not return to the former state with the angle being formed, and is hitched. The hitch during bending becomes a problem at the time of assembly of the constant velocity universal joint with respect to the automobile. That is, when assembling the constant velocity universal joint to the automobile, the operation for returning the joint to the former state after being bent once is necessary. Therefore, when the operating angle is small and the hitch occurs at the time of bending, efficiency in assembly operation of the constant velocity universal joint with respect to the automobile is low.

JP 2006-266423 A discloses means for preventing the maximum operating angle of the joint from being reduced and for increasing the sliding stroke by setting the track crossing angles $\alpha$ of the track grooves 106, 109 to 10 to 15° and by setting the number of balls 103 to be ten.

That is, in the cross groove constant velocity universal joint, when the balls 103 exist at a certain phase and the operating angle is increased, wedge angles formed at the crossing portions between the track grooves 106 of the inner joint member 101 and the track grooves 109 of the outer joint member 102 are reversed, whereby the force applied from the balls 103 to the cage 104 is imbalanced, and hence the cage 104 becomes unstable.

When the track crossing angles α of the track grooves 106, 109 are reduced, the above-mentioned phenomenon remarkably appears in the case of using six or less balls 103. However, in the case of using ten balls 103, even when the track crossing angles α are reduced, the cage 104 is stably driven up to a certain value. This is because driving force of the balls 103 in which the wedge angles are reversed is divided by the other balls 103 so that the driving of the cage 104 is stabilized.

SUMMARY OF THE INVENTION

Incidentally, higher mileage and higher functionality of automobiles in recent years increase the need for reduction in weight and size of the constant velocity universal joint. Therefore, the components constituting the constant velocity universal joint are formed into shapes appropriately reduced in size with functions thereof not being deteriorated.

However, when the constant velocity universal joint is to be further reduced in weight and size, contact force increases between components, and durability is reduced by excessive heat generation. In the structure of the cross groove constant velocity universal joint, contact portions, lubricating ability of which affects durability, between the components, include contact portions X between the balls 103 and the track grooves 106 of the inner joint member 101, contact portions Y between the balls 103 and the track grooves 109 of the outer joint member 102, and contact portions Z between the balls 103 and the pockets 110 of the cage 104 (see FIG. 7). At the contact portions X, Y, and Z with respect to the balls 103, the contact force increases due to reduction in weight and size of the constant velocity universal joint as described above, and hence there is a fear that durability decreases due to the excessive heat generation.

The present invention has been made in view of the above-mentioned problems, and an object thereof is therefore to provide a plunging type constant velocity universal joint capable of easily achieving reduction in weight and size and increase in durability even when the contact force at the contact portions with respect to the balls increases.

Figure 1:
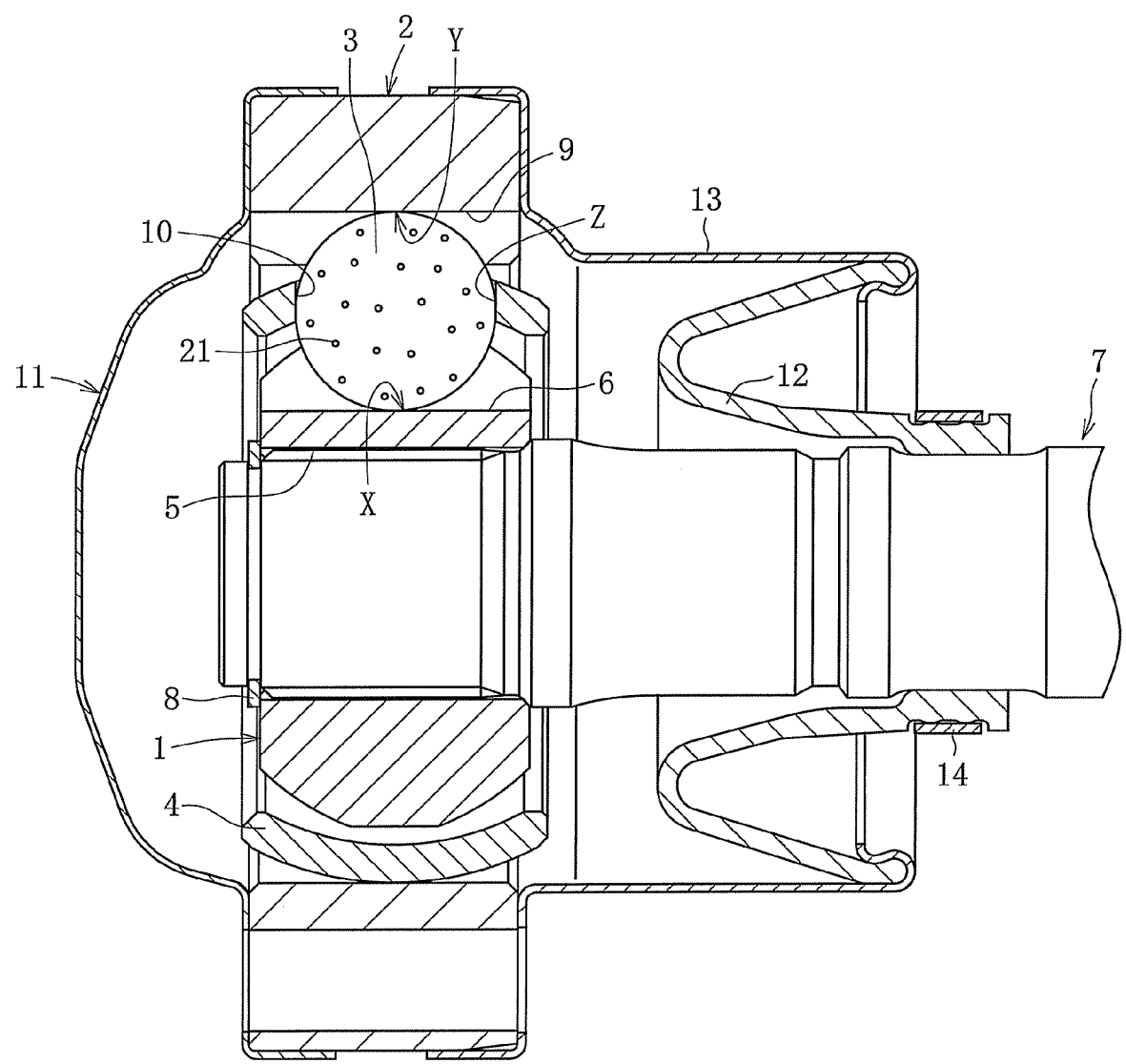
FIG. 1 is a sectional view of a plunging type constant velocity universal joint according to an embodiment of the present invention, illustrating a main portion structure of a cross groove constant velocity universal joint of a disk type.

As a technical means for achieving the above-mentioned object, according to the present invention, provided is a plunging type constant velocity universal joint including: an inner joint member having an outer peripheral surface in which a plurality of linear track grooves are formed in an axial direction with being inclined with respect to an axial line; an outer joint member having an inner peripheral surface in which a plurality of linear track grooves are formed in the axial direction with being inclined with respect to the axial line in a direction opposite to that of the track grooves of the inner joint member, and having an inside filled with a lubricant; balls incorporated in respective crossing portions between the track grooves of the inner joint member and the track grooves of the outer joint member; and a cage arranged between the outer peripheral surface of the inner joint member and the inner peripheral surface of the outer joint member, for retaining the balls in the same plane, in which a large number of minute recesses are formed at random in surfaces of the balls.

In the present invention, a large number of minute recesses are formed at random in the surfaces of the balls. Therefore, even when the contact force increases, during rotation of the joint, at contact portions between the balls and the track grooves and contact portions between the balls and pockets of the cage, the lubricant entering into a large number of minute recesses in the surfaces of the balls is interposed in contact interfaces at the contact portions with respect to the balls, whereby satisfactory oil film layer can be formed. As a result, friction generated at the contact portions with respect to the balls can be reduced, and hence durability can be improved without generating excessive heat.

Note that, a coefficient of friction of the above-mentioned lubricant is preferably set to 0.070 or less. Further, it is desirable that an urea grease having consistency of No. 0 to No. 2 be used as the lubricant. The use of such lubricant enables effective reduction of friction generated at the contact portions with respect to the balls.

Further, it is desirable to set surface roughness of the balls in which a large number of minute recesses are formed to Ra 0.03 to 0.6 μm, preferably Ra 0.05 to 0.15 μm, to set a parameter SK value of the surface roughness of the balls to −1.0 or less, preferably −4.9 to −1.0, and to set a ratio of a total area of the minute recesses to the surface area of the balls to 10 to 40%. Setting to the above-mentioned values enables the lubricant to moderately enter the minute recesses in the ball surfaces to be retained therein, thereby facilitating formation of oil film layer formed by the lubricant at the contact portions with respect to the balls. As a result, it is possible to effectively reduce the friction at the contact portions with respect to the balls.

Note that it is desirable that the number of the balls, the track grooves of the outer joint member, and the track grooves of the inner joint member is respectively ten. With this number, efficiency in assembly operation of the constant velocity universal joint with respect to automobiles is improved. As a result, driving of the cage is stabilized even when track crossing angles are reduced, and hence operability of the constant velocity universal joint can be improved.

According to the present invention, a large number of minute recesses are formed at random in the surfaces of the balls, and hence the oil film layer is easily formed by the lubricant at the contact portions with respect to the balls, whereby lubricating ability is improved at the contact portions with respect to the balls. As a result, friction is reduced at the contact portions with respect to the balls, whereby torque transmitting efficiency can be improved. Further, rolling fatigue life of the balls and the track grooves can be lengthened. As a result, it is possible to improve durability of the constant velocity universal joint.

DETAILED DESCRIPTION OF THE INVENTION

FIGS. 1 to 4 illustrate an example of a cross groove constant velocity universal joint of a disk type according to an embodiment of the present invention. The present invention is also applicable to a cross groove constant velocity universal joint not only of the disk type but also of a flange type or a bell type.

Further, the cross groove constant velocity universal joint is roughly divided into two types including: a float type in which the minimum inner diameter of a cage 4 is set to be smaller than the maximum outer diameter of an inner joint member 1 so that an amount of axial displacement is regulated due to the interference between the inner peripheral surface of the cage 4 and the outer peripheral surface of the inner joint member 1; and a non-float type in which the minimum inner diameter of the cage 4 is set to be larger than the maximum outer diameter of the inner joint member 1 so that the amount of axial displacement is regulated due to the interference between balls 3 and the pillar portion of the cage 4, an end cap 11, and a boot adapter 13 (when an angle is formed, the inner peripheral surface of the cage 4 and the outer peripheral surface of the inner joint member 1 may interfere with each other). Both the types are selectively used in accordance with characteristics (sliding amount, load capacity, and the like) of a vehicle to which a propeller shaft and a drive shaft are provided. In this embodiment, there is exemplified the float type, but the present invention is also applicable to the non-float type.

Figure 2:
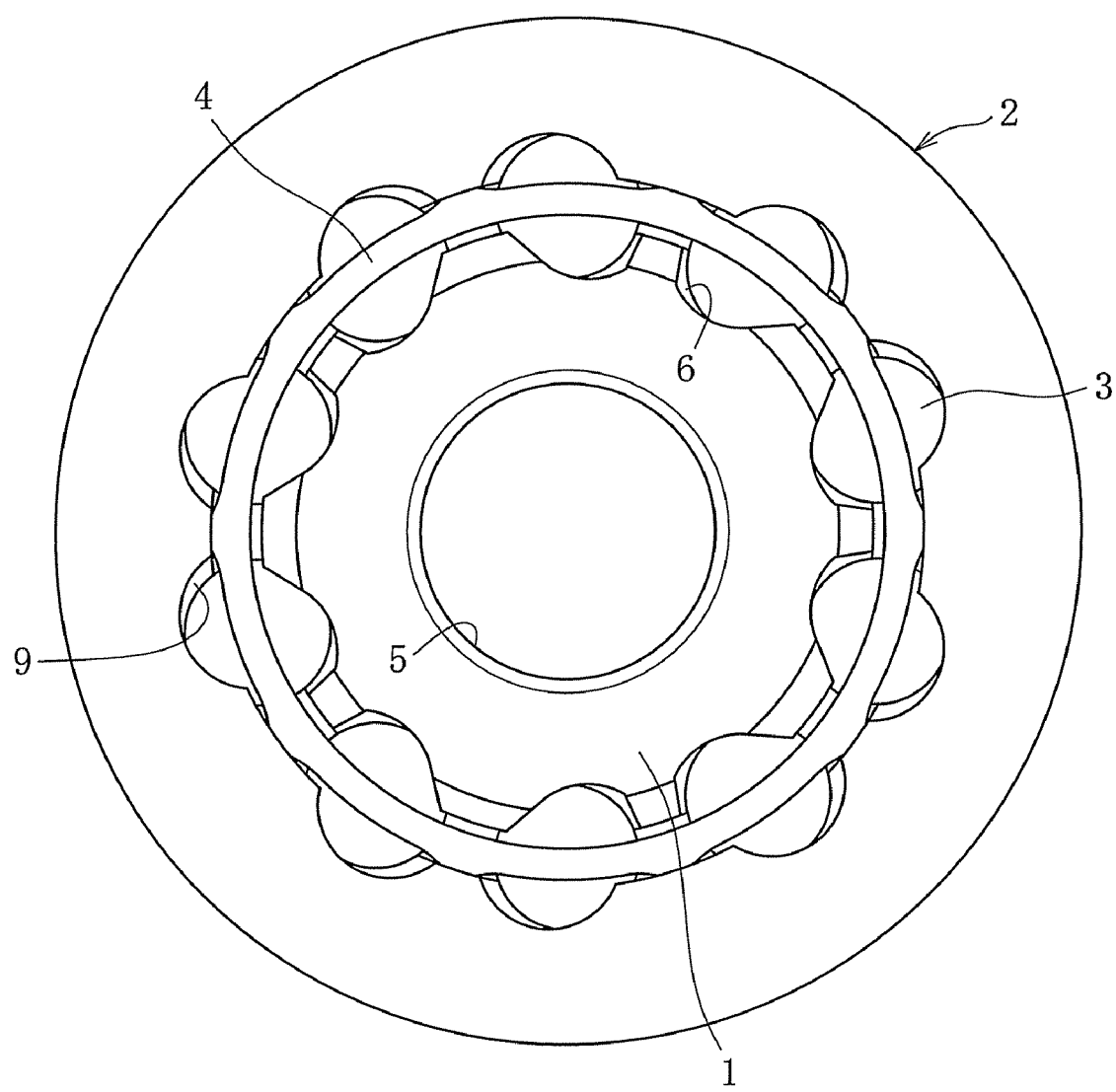
FIG. 2 is a side view illustrating an outer joint member, an inner joint member, balls, and a cage of FIG. 1.

As illustrated in FIGS. 1 and 2, the constant velocity universal joint according to this embodiment includes as main components an inner joint member 1, an outer joint member 2, balls 3, and a cage 4.

The inner joint member 1 has an outer peripheral surface in which a plurality of linear track grooves 6 are formed in the axial direction. Further, a shaft 7 is spline-fitted in a central hole 5 of the inner joint member, and torque can be transmitted between the inner joint member 1 and the shaft 7 owing to this spline-fitting. Note that the shaft 7 is prevented from being detached from the inner joint member 1 by a snap ring 8.

The outer joint member 2 is positioned along the outer periphery of the inner joint member 1, and has an inner peripheral surface in which linear track grooves 9 are formed in the axial direction by the same number as that of the track grooves 6 of the inner joint member 1. The cage 4 is arranged between the inner joint member 1 and the outer joint member 2, and the balls 3 are housed in pockets 10 of the cage 4.

Figure 3:
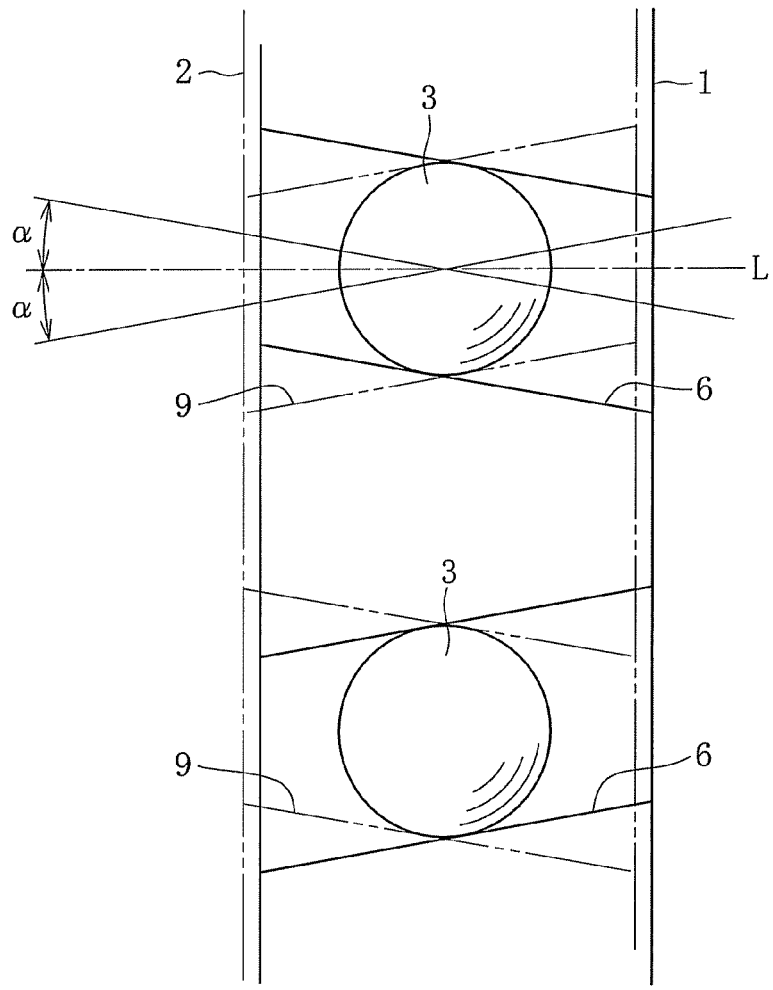
FIG. 3 is a partial front view illustrating a track crossing angle α in the inner joint member and the outer joint member of FIG. 2.

The track grooves 6 of the inner joint member 1 and the track grooves 9 of the outer joint member 2 form, as illustrated in FIG. 3 (cage 4 is not shown), an angle in the opposite direction with respect to an axial line L (track crossing angle α). The balls 3 are incorporated in crossing portions between the track grooves 6 (indicated by solid lines in FIG. 3) of the inner joint member 1 and the track grooves 9 (indicated by chain lines in FIG. 3) of the outer joint member 2, the track grooves 6 and the track grooves 9 being paired with each other. Further, the track grooves 6 adjacent to each other of the inner joint member 1 and the track grooves 9 adjacent to each other of the outer joint member 2 are arranged while being inclined in opposite directions to each other with respect to the axial line L by the track crossing angle α.

Figure 4:
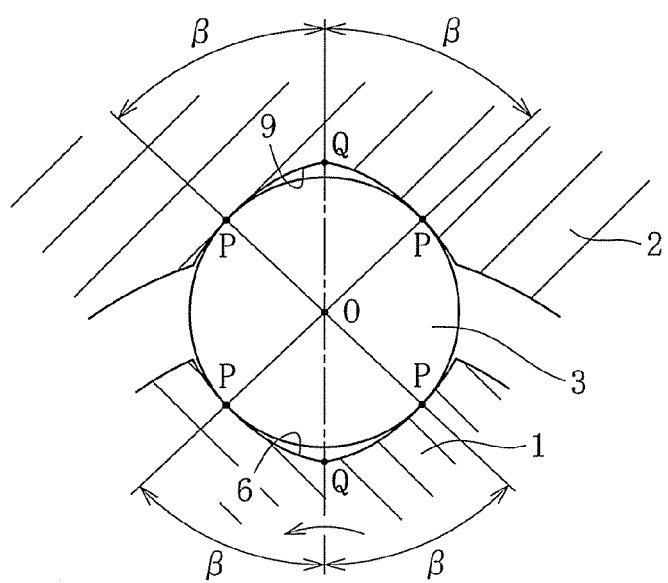
FIG. 4 is a sectional view illustrating track grooves of the inner joint member and the outer joint member and the balls of FIG. 2 taken at a central position in the axial direction.

FIG. 4 is a cross sectional view illustrating the track grooves 6 of the inner joint member 1 and the track grooves 9 of the outer joint member 2. As illustrated in FIG. 4, the cross sectional shape of the track grooves 6, 9 is a shape of a gothic arch having the curvature radius larger than the radius of the balls 3 and formed by broaching or the like. The track grooves 6 of the inner joint member 1 and the track grooves 9 of the outer joint member 2 contact each of the balls 3 at two points P, whereby angular contact having ball contact angles β is achieved. In this case, the ball contact angles β mean angles formed between ball contact centers P at which the ball 3 and the track grooves 6, 9 come into contact with each other and groove bottom centers Q of the track grooves 6, 9 with reference to a center Q of each of the balls 3.

The number of balls 3, track grooves of the outer joint member 2, and the track grooves of the inner joint member 1 is respectively ten. By setting the number of the balls 3, the track grooves of the outer joint member 2, and the track grooves of the inner joint member 1 to be ten, efficiency in assembly operation of the constant velocity universal joint to an automobile can be improved. Therefore, driving of the cage 4 is stabilized even when the track crossing angle α becomes small, and hence the operability of the constant velocity universal joint can be improved.

On the other hand, to one axial end (left side in FIG. 1) of the outer joint member 2, an end cap 11 for preventing leakage of the lubricant filled inside the joint and invasion by foreign matters is fixed by bolting. Further, a sealing device is attached between the other axial end (right side in FIG. 1) of the outer joint member 2 and the shaft 7.

The sealing device includes a boot 12 and a boot adapter 13 made of metal. The boot 12 has a small end portion and a large end portion, and has a shape folded back at the middle portion in a V-shape. The boot adapter 13 is formed into a cylindrical shape, and has a flange, which is formed at one end thereof and fitted to the outer peripheral surface of the outer joint member 2. The boot adapter 13 is fixed to the outer joint member 2 together with the end cap 11 by bolting. The small end portion of the boot 12 is attached to the shaft 7 and clamped by a boot band 14. The large end portion of the boot 12 is retained by crimping the end portion of the boot adapter 13.

As illustrated in FIG. 1, what contributes to improvement in durability is to reduce friction at contact portions X between the balls 3 and the track grooves 6 of the inner joint member 1, contact portion Y between the balls 3 and the track grooves 9 of the outer joint member 2, and contact portion Z between the balls 3 and the pockets 10 of the cage 4 (hereinafter, referred to as contact portions X, Y, Z with respect to the balls 3).

In this case, in order to reduce friction at the contact portions X, Y, Z with respect to the balls 3, it is necessary to form a sufficient oil film layer so as to reduce a coefficient of friction. However, large force is applied to the contact portions X, Y, Z with respect to the balls 3 during torque transmission, and hence there is a fear that the sufficient oil film layer is not formed due to contact pressure thereof.

Accordingly, it is effective to suppress friction generated by slippage at the contact portions X, Y, Z with respect to the balls 3 so as to improve the durability by performing surface treatment on the contact portions X, Y, Z with respect to the balls 3 so that a lubricant is easily interposed therein to form a more satisfactory oil film layer.

In view of this, a large number of minute recesses 21 (see FIG. 1) are formed at random in the surfaces of the balls 3, and surface roughness (arithmetic average roughness) of the balls 3 is set to Ra 0.03 to 0.6 μm, more preferably Ra 0.05 to 0.15 μm. Further, ratio of the total area of the minute recesses 21 to the surface area of the balls 3 is set to 10 to 40%.

Further, a parameter SK value of the surface roughness of the balls 3 is set to −4.9 to −1.0. In this case, the SK value represents skewness of a distribution curve of the surface roughness, that is, a value representing relativity of the amplitude distribution curve of the concavity and convexity with respect to the average line of the surface roughness. The SK value is represented by the following formula.

$$SK = \int (x-x_0)^3 \cdot P(x) dx / \sigma^3$$

where x represents: roughness height, $x_0$: roughness average height, P(x): frequency function of roughness amplitude, and σ: root-mean-square roughness.

The parameter SK value becomes positive when peaks of the amplitude distribution curve are larger with respect to the average line of the surface roughness, it becomes zero when peaks and troughs are equal to each other, and it becomes negative value when the troughs are larger than the peaks. Therefore, the parameter SK value of the surface roughness of the balls 3 in which a large number of minute recesses 21 are formed becomes negative value.

The values obtained by numerically limiting the SK value of the balls 3, the surface roughness Ra, and the total area ratio of the minute recesses 21 represent a range which is effective for forming the oil film layer of the lubricant on the surfaces of the balls 3.

That is, when the surface roughness (arithmetic average roughness) of the balls 3 is smaller than Ra 0.03 μm, the depth of the minute recesses 21 becomes shallow, and the lubricant is not interposed in the minute recesses 21, and hence the effect of improving durability can not be obtained. In contrast, when it is larger than Ra 0.6 μm, durability of the mating members with respect to the balls 3 at the contact portions is reduced. Further, when the ratio of the total area of the minute recesses 21 to the surface area of the balls 3 is smaller than 10%, the number of minute recesses 21 is reduced, and the formation of the satisfactory oil film layer is difficult, and hence the effect of improving durability cannot be obtained. In contrast, when it is larger than 40%, the effective contact area with the mating members is reduced, and hence the effect of improving durability is small. Further, when the parameter SK value of the surface roughness of the balls 3 is smaller than −4.9, the area of the recesses is increased in view of processing conditions, and the effective contact area is reduced, and hence the effect of improving the durability is small. In contrast, when it is larger than −1.0, the depth of the minute recesses 21 becomes shallow, and the lubricant is not interposed in the minute recesses 21, and hence the effect of improving durability cannot be obtained.

Figure 5:
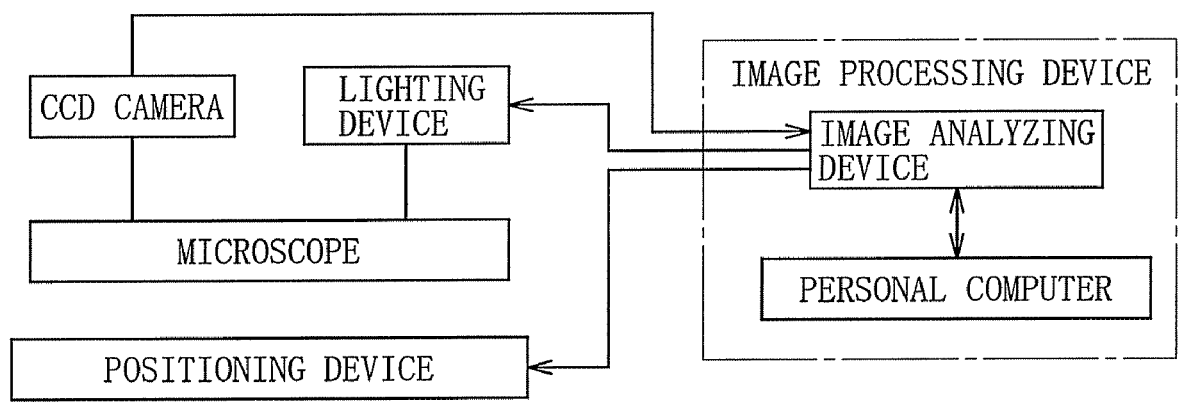
FIG. 5 is a schematic view of a measurement device which performs quantitative measurement of a large number of minute recesses formed in the balls.

The measurement of the surface roughness Ra, the SK value, and the total area ratio of the minute recesses 21 is performed on the surfaces of the balls 3 at six points separated from each other by approximately 90°, and evaluation and determination are made based on the average value thereof. The determination of the effective range is also based on this method. For quantitative measurement of the minute recesses 21, the measurement is performed by the device having the configuration illustrated in FIG. 5. The capturing method involves setting of a ball on the positioning device, magnifying of the surface of the ball by a microscope, and capturing of an image thereof by a CCD camera in an image processing device constituted by an image analyzing device and a personal computer. The analysis is performed on the basis that white portions of the image are surface flat portions, and black portions thereof are recessed portions. The black portions of the image are regarded as the recessed portions, and size and distribution thereof are calculated and the surface area ratio is obtained, thereby performing the evaluation. The detailed method of the surface examination is disclosed in JP 2001-183124 A.

The measurement of the surface roughness and the SK value is performed using a measurement device Form Talysurf (manufactured by Taylor Hobson). Measurement conditions are made as follows: cutoff type; Gaussian, measurement length; 5 λ, cutoff number: 6, cutoff wavelength; 0.25 mm, measurement magnification ratio; 10000 times, and measurement speed; 0.30 mm/s. Note that, the method of forming a large number of the minute recesses 21 in the surfaces of the balls 3 includes a special barrel polishing. However, other than this, the surface processing may be performed by shot blast processing and the like.

Figure 6:
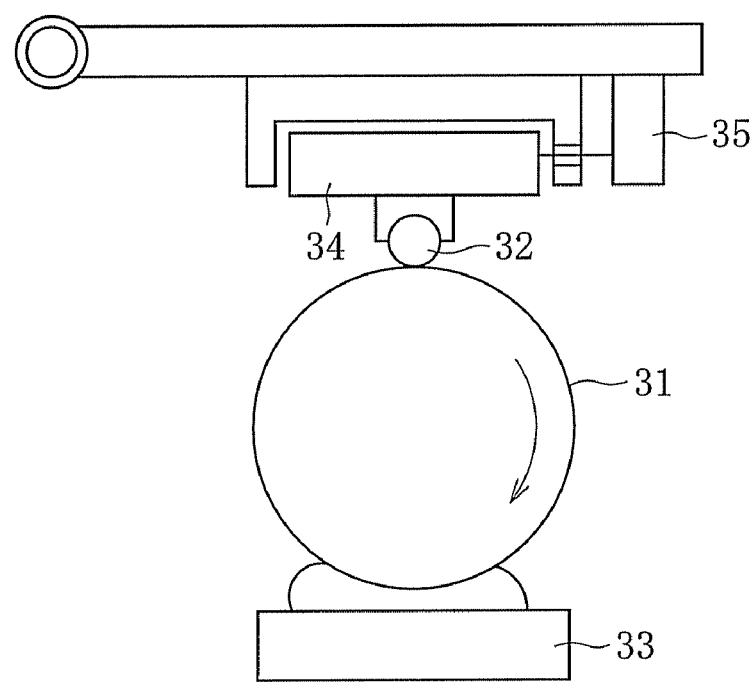
FIG. 6 is a schematic view of a savan type frictional wear testing machine.
Figure 7:
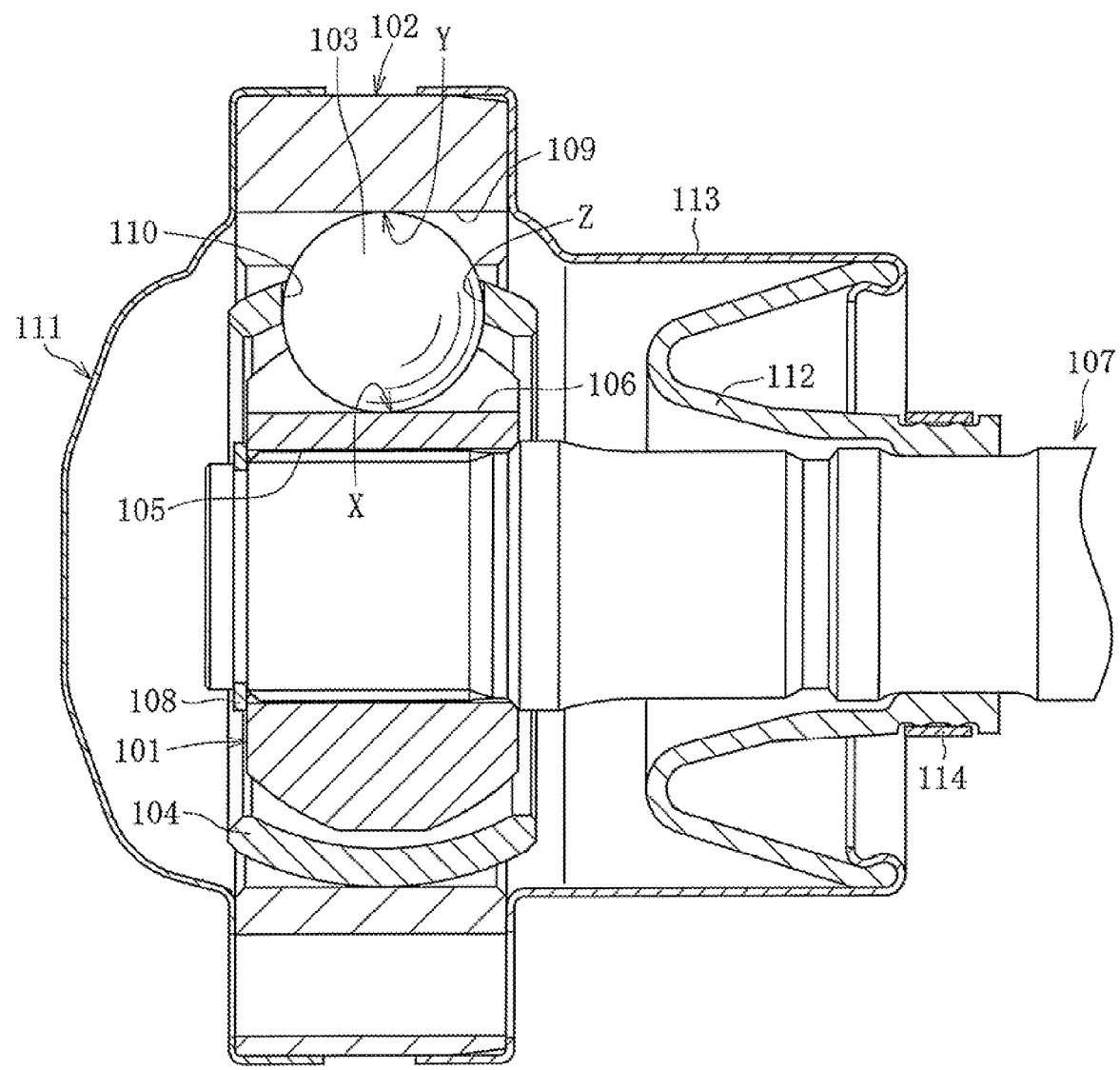
FIG. 7 is a sectional view of a plunging type constant velocity universal joint according to a conventional example, illustrating a main portion structure of a cross groove constant velocity universal joint of a disk type.
Figure 8:
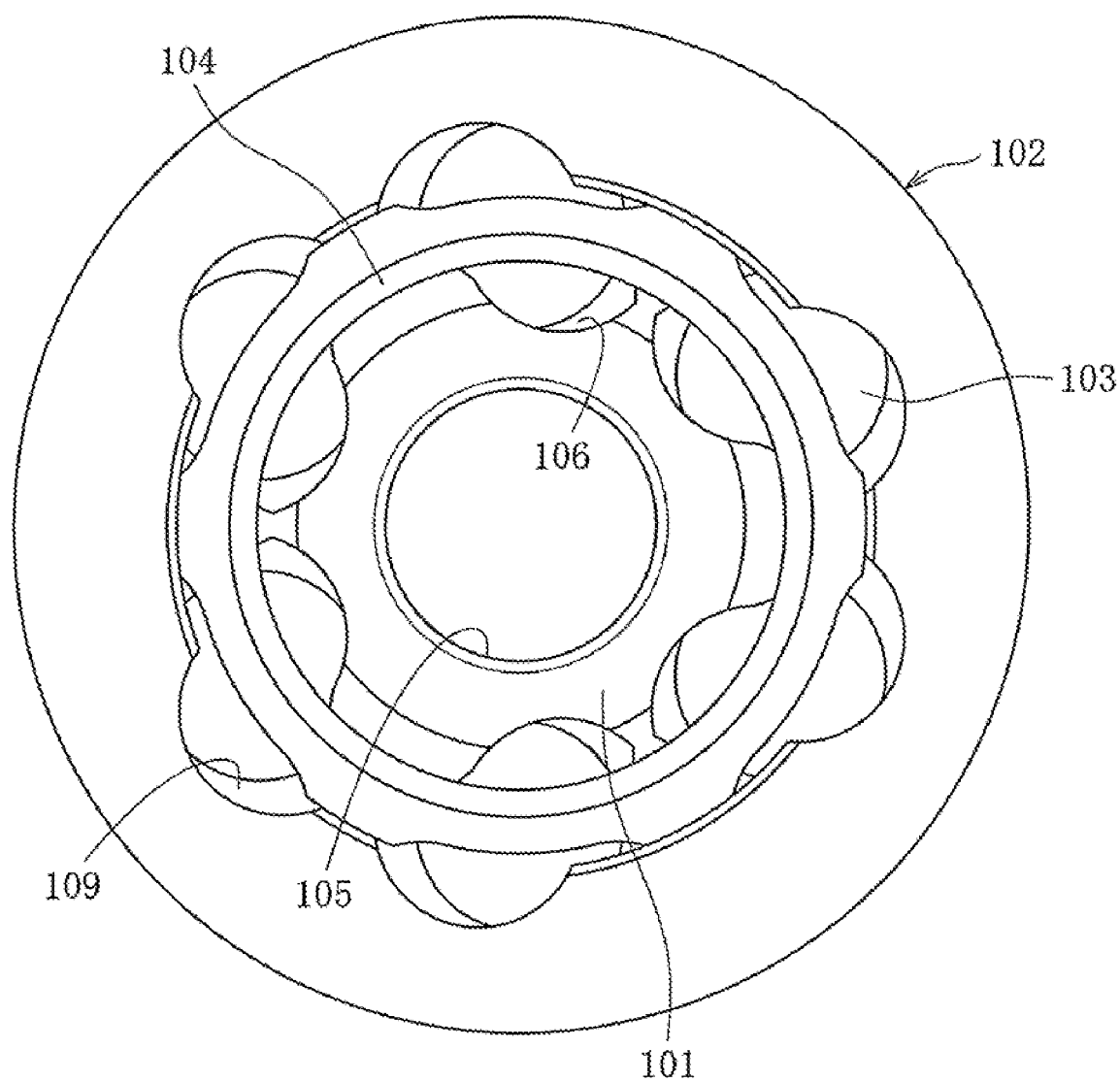
FIG. 8 is a side view illustrating an outer joint member, an inner joint member, balls, and a cage of FIG. 7.
Figure 9:
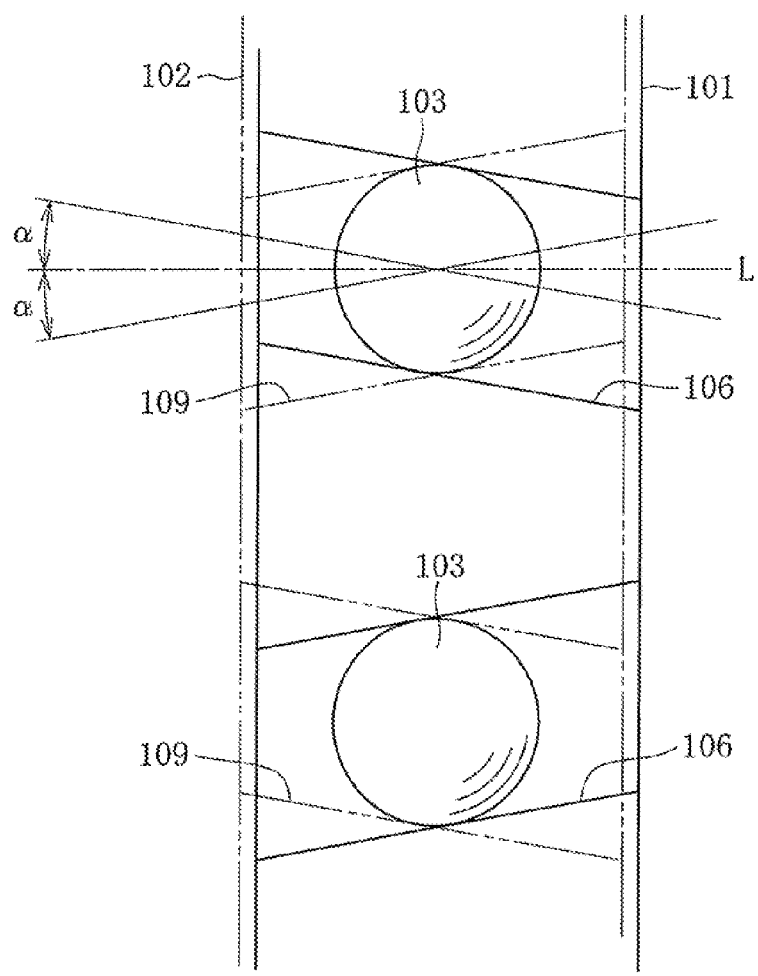
FIG. 9 is a partial front view illustrating a track crossing angle α of the inner joint member and the outer joint member of FIG. 8.
Figure 10:
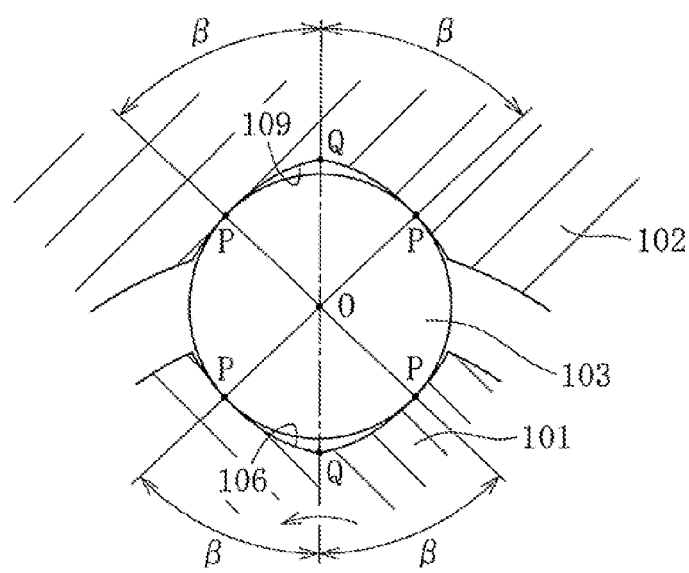
FIG. 10 is a sectional view illustrating track grooves of the inner joint member and the outer joint member and the balls of FIG. 8 taken at a central position in the axial direction.

Further, as the lubricant, one having a low coefficient of friction is desirable. For example, the lubricant in which the upper limit value of the coefficient of friction is 0.07 when measured by a savan type frictional wear testing machine is desirable. In this case, the savan type frictional wear testing machine is, as illustrated in FIG. 6, obtained by bringing a steel ball 32 of ¼ inch into contact with a rotation ring 31 of a diameter 40 mm and the thickness 4 mm. When measuring the coefficient of friction, the rotation ring 31 is rotated at the circumferential speed of 108 m/min, the load 12.7 N is applied, the lubricant is supplied to the surface of the rotation ring 31 through an intermediation of a sponge 33 from a lower end of the rotation ring 31, and movement of an air slide 34 supporting the steel ball 32 is detected by a load cell 35, to thereby perform measurement of the coefficient of friction.

A specific example of the lubricant includes an urea grease. Consistency of the urea grease is No. 0 to No. 2. Note that when the consistency is smaller than No. 0, the sealing structure is complicated. Therefore, when being used at high speed, it is likely that shortage of the lubricant occurs due to centrifugal force. Further, when it is larger than No. 2, it is difficult to interpose the lubricant, and hence the contact resistance becomes large, which causes torque loss.

Even when the contact force at the contact portions X, Y, Z with respect to the balls 3 becomes large during rotation of the joint, the lubricant entering into a large number of minute recesses 21 in the surfaces of the balls 3 is interposed in the contact interface at the contact portions X, Y, Z with respect to the balls 3, whereby the satisfactory oil film layer can be formed. As a result, lubricating ability is improved at the contact portions X, Y, Z with respect to the balls 3, whereby friction can be reduced at the contact portions X, Y, Z with respect to the balls 3 to improve torque transmission efficiency. Further, rolling fatigue life of the balls 3 and the track grooves 6, 9 can be lengthened.

The present invention is not limited to the above-mentioned embodiment, and can be made according to various embodiments without departing from the gist of the present invention. The scope of the present invention is specified by the scope of Claims, and includes meaning of equivalent described in the scope of Claims and modifications in the scope thereof.

The invention claimed is:

1. A plunging type constant velocity universal joint, comprising:
   an inner joint member having an outer peripheral surface with a plurality of linear track grooves formed in an axial direction and being inclined with respect to an axial line;
   an outer joint member having a first axial end, a second axial end, and an inner peripheral surface with a plurality of linear track grooves formed in the axial direction and being inclined with respect to the axial line in a direction opposite to that of the track grooves of the inner joint member, and having an inside filled with a lubricant;
   balls incorporated in respective crossing portions between the track grooves of the inner joint member and the track grooves of the outer joint member; and
   a cage arranged between the outer peripheral surface of the inner joint member and the inner peripheral surface of the outer joint member, and being configured to retain the balls in the same plane,
   wherein a large number of minute recesses are disposed at random in a surface of each of the balls;
   an end cap is fixed to the first axial end of the outer joint member, and a sealing device is attached between the second axial end of the outer joint member and a shaft,
   the lubricant is in the large number of minute recesses in the surfaces of the balls and is interposed at contact interfaces at contact portions between the balls and the track grooves and contact portions between the balls and pockets of the cage, whereby an oil film layer is formed, and
   wherein:
   a surface roughness of the surface of each of the balls in which the minute recesses are formed is Ra 0.03 to 0.6 µm;
   a parameter skewness of the distribution curve of the surface roughness of the balls is −1.0 or less; and
   a ratio of a total area of a large number of the minute recesses to a surface area of the balls is 10 to 40%.

2. A plunging type constant velocity universal joint according to claim 1, wherein a coefficient of friction of the lubricant is 0.070 or less.

3. A plunging type constant velocity universal joint according to claim 2, wherein the balls comprise ten balls.

4. A plunging type constant velocity universal joint according to claim 1, wherein:
   the surface roughness of the surface of each of the balls is Ra 0.05 to 0.15 µm; and
   the parameter skewness of the distribution curve of the surface roughness of the balls is −4.9 to −1.0.

5. A plunging type constant velocity universal joint according to claim 4, wherein the balls comprise ten balls.

6. A plunging type constant velocity universal joint according to claim 1, wherein the balls comprise ten balls.

7. A plunging type constant velocity universal joint, comprising:
   an inner joint member having an outer peripheral surface with a plurality of linear track grooves formed in an axial direction and being inclined with respect to an axial line;
   an outer joint member having a first axial end, a second axial end, and an inner peripheral surface with a plurality of linear track grooves formed in the axial direction and being inclined with respect to the axial line in a direction opposite to that of the track grooves of the inner joint member, and having an inside filled with a lubricant;
   balls incorporated in respective crossing portions between the track grooves of the inner joint member and the track grooves of the outer joint member; and
   a cage arranged between the outer peripheral surface of the inner joint member and the inner peripheral surface of the outer joint member, and being configured to retain the balls in the same plane,
   wherein a large number of minute recesses are disposed at random in a surface of each of the balls;
   an end cap is fixed to the first axial end of the outer joint member, and a sealing device is attached between the second axial end of the outer joint member and a shaft,
   the lubricant is in the large number of minute recesses in the surfaces of the balls and is interposed at contact interfaces at contact portions between the balls and the track grooves and contact portions between the balls and pockets of the cage, whereby an oil film layer is formed,
   wherein a coefficient of friction of the lubricant is 0.070 or less, and
   wherein:
   surface roughness of the surface of each of the balls in which the minute recesses are formed is Ra 0.03 to 0.6 µm;
   a parameter skewness of the distribution curve of the surface roughness of the balls is −1.0 or less; and
   a ratio of a total area of a large number of the minute recesses to a surface area of the balls is 10 to 40%.

8. A plunging type constant velocity universal joint according to claim 7, wherein the balls comprise ten balls.

* * * * *